United States Patent [19]

Bongenaar

[11] 4,155,102

[45] May 15, 1979

[54] CATHODE RAY TUBE

[75] Inventor: Hendrik Bongenaar, Eindhoven, Netherlands

[73] Assignee: U.S. Philips Corporation, New York, N.Y.

[21] Appl. No.: 833,302

[22] Filed: Sep. 14, 1977

[30] Foreign Application Priority Data

Aug. 15, 1977 [NL] Netherlands ........................ 7708958

[51] Int. Cl.² ............................................ H04N 5/645

[52] U.S. Cl. ................................ 358/248; 220/2.1 A; 220/2.3 A; 358/246

[58] Field of Search ............................... 358/246, 248; 220/2.1 A, 2.3 A

[56] References Cited

U.S. PATENT DOCUMENTS

| | | | |
|---|---|---|---|
| 3,614,519 | 10/1971 | Figlewicz | 358/248 |
| 3,777,057 | 12/1973 | Abe | 358/246 |
| 3,996,491 | 12/1976 | Larson | 358/246 |
| 4,031,553 | 6/1977 | Sumiyoshi | 358/246 |

*Primary Examiner*—Howard W. Britton
*Attorney, Agent, or Firm*—Algy Tamoshunas

[57] ABSTRACT

Disclosed is a cathode ray tube with a metal anti-implosion strap which is electrically connected to the external conductive coating on the conical portion of the tube envelope. The conductive coating extends beneath on adhesive-containing layer provided around the side wall of the display window beneath the metal strap. Positioned between the conductive coating and the metal strap is a metal contact member which electrically shunts the adhesive-containing layer and directly contacts the conductive coating and the metal strap connecting the latter to the conductive coating.

6 Claims, 3 Drawing Figures

CATHODE RAY TUBE

The invention relates to a cathode ray tube whose glass envelope comprises a neck portion, a conical portion and a substantially rectangular display window having an upright side wall. The tube has an anti-implosion construction which includes an adhesive-containing layer provided around the upright side wall of the display window and a metal strap disposed over the adhesive-containing layer. The metal strap is electrically connected to a coating of electrically readily conductive material provided on the exterior surface of the conical portion.

In cathode ray tubes, for example television display tubes, both the inside and the outside surfaces of the conical portion of the envelope are usually provided at least partly with an electrically conductive coating. The inner coating is usually connected to the last electrode of the electron gun, so that during operation the electrode and the inner coating are at the same electrical potential. The outer coating is connected to ground, that is to say, is connected to the chassis of the receiver. The inner coating, and the outer coating with the glass of the conical portion therebetween acting as a dielectric, form a capacitor which smoothes the high voltage supplied to the inner coating. Furthermore, the capacitor acts as a filter for suppressing interference radiation caused, for example, by the line flyback pulse. It is thus of importance that the outer coating on the conical portion be connected to ground in a good and reliable manner. A component on the outside of the tube envelope which provides a good ground connection to the chassis is the metal reinforcement strap which is provided around the upright side wall of the display window. A problem, however, arises in obtaining a good and, in particular, a reliable electrical connection between the conductive outer coating on the conical portion and the metal reinforcement strap.

U.S. Pat. No. 3,996,491 discloses a construction in which an electrical connection between the outer coating and the metal reinforcement strap of a display tube is obtained by means of a strip of electrically conductive material. On the one hand, the strip is overlapped by the conductive outer coating on the conical portion and, on the other hand contacts the metal reinforcement strap. The simplest embodiment of an electrical connection between the outer coating and the metal strap is that in which, as shown in FIG. 4 of the cited patent, the connection strip is in the form of a conductive suspension or paste. A problem, however, is to obtain a good and reliable electrical contact between the suspension or paste and the metal strap. In the case in which the metal strip is provided over the conductive strip, this can easily be damaged during mounting of the metal strap so that a good contact is not ensured. When the conductive strip is provided across the metal strap, the suspension or paste, after having been dried, may easily crack or tear at the edge of the metal strap resulting in a poor electrical connection.

The use of a conductive suspension or paste to form the electrical connection creates a problem in particular when an adhesive-containing layer which is electrically insulating is provided between the metal strap and the glass surface of the tube envelope.

It is the object of the invention to provide a cathode ray tube which has a good and reliable low resistance electrical connection between the conductive outer coating on the conical portion of the tube and the metal reinforcement construction of the tube.

According to the invention, a cathode ray tube of the kind mentioned in the preamble is characterized in that the electrical connection between the conductive coating on the conical portion and the metal reinforcement construction or strap of the tube is formed by an electrically conductive layer provided on the glass wall of the tube in the form of a suspension or paste. The layer, on the one hand, contacts the conductive coating on the conical portion and, on the other hand, extends beneath the adhesive-containing layer of the anti-implosion construction and is connected at that area to the metal strap by means of a metal contact member. The contact member, on the one hand, directly contacts the portion of the conductive layer underlying the adhesive-containing layer and on the other hand, makes a metallic contact with the metal strap so that the adhesive-containing layer is electrically shunted.

According to a first embodiment of the invention, the metal contact member is a flexible strip having a first portion disposed between the electrically conductive layer and the adhesive-containing layer, and a second portion which is disposed between the adhesive-containing layer and the metal strap. The tensile force in the metal strap ensures sufficient pressure to produce a good electrical contact between the strip and the conductive layer, on the one hand, and the strip and the metal strap on the other hand.

According to a second embodiment of the invention, the metal contact member is a plate-shaped element which is positioned between the adhesive-containing layer and the electrically conductive layer and whose surface facing the adhesive-containing layer has at least one projection which extends through the adhesive-containing layer and makes a metallic contact with the metal strap. As a result of the high surface pressure (specific pressure) which the metal strap exerts on the contact member at the area of the projection, a reliable electrical contact is produced between the contact member and the strap in spite of the adhesive-containing layer. Because the surface pressure produced by the metal strap is maximum at the four corners of the display window, the metal contact member is preferably positioned on at least one of the four corner portions. According to a very practical embodiment of the invention, the contact member is formed integral with at least one of the mounting lugs with which the tube is normally provided for the mounting thereof in a cabinet.

The electrically conductive layer extending beneath the adhesive-containing layer preferably has the same composition as the electrically conductive coating on the conical portion. The layer may be formed integrally with the coating on the conical portion in one operation.

The invention will be described in greater detail with reference to the drawing, in which.

Figure 1:
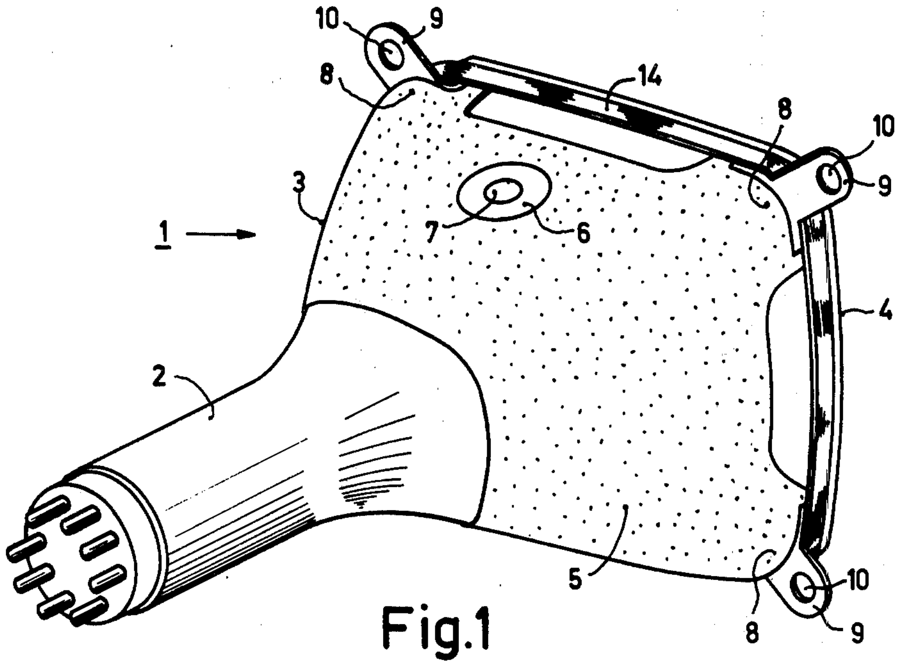
FIG. 1 is a perspective view of a cathode ray tube according to the invention.

The cathode ray tube shown in FIG. 1 comprises a glass envelope 1 having a neck portion 2, a conical portion 3 and a rectangular display window 4. An electrically conductive coating 5 is provided on the conical portion 3, whereas an area 6 around the high-voltage contact 7 is not covered. The conductive coating 5 has a composition which is usual for this purpose and consists of 60–90 parts by weight of graphite and 10–40 parts by weight of an inorganic binder, for example potassium silicate or sodium silicate. Such a material in the form of an aqueous suspension is provided by spraying or brushing. The conductive layer 5 extends over the corner portion 8 beneath the anti-implosion construction which is provided around the upright side wall of the display window 4. It is alternatively possible for the conductive coating 5 to extend over the entire tube circumference underlying the anti-implosion construction. At the four corner portions 8 the tube has metal mounting lugs 9 for mounting the tube in a cabinet.

Figure 2:
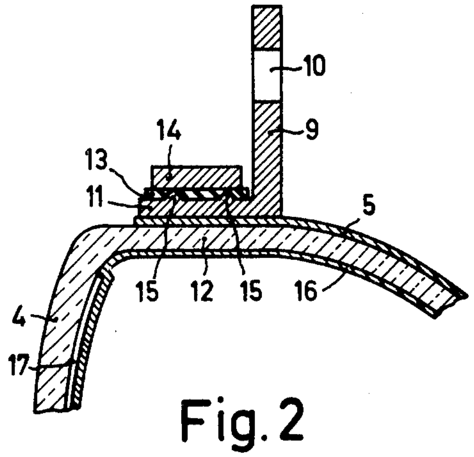
FIG. 2 is a sectional view through a corner portion of the tube shown in FIG. 1.

As can be seen from the sectional view shown in FIG. 2, the assembly lugs 9 have an L-shaped cross-section. One limb 11 of the lugs bears directly against the continuous conductive coating 5 and the other limb has an aperture 10. The anti-implosion construction includes a tape 13 wound around the upright side wall 12 of the display window 4 and a metal strap 14 tensioned over the tape. The tape 13 consists of a fabric of glass fibres embedded in an adhesive. The conductive coating 5 is electrically connected to the metal strap 14 by the limb 11 of the mounting lug 9. For that purpose the surface of the limb 11 facing the metal strap 14 is provided with projections 15 which electrically shunt the tape 13. A tensile force of approximately 200 kg prevails in the metal strap 14 so that at the area of the projections 15 a high specific pressure is exerted on the limb 11. In this manner a good electrical contact is obtained between the limb 11 and the coating 5, on the one hand, and the limb 11 and the metal strap 14 on the other hand. The projections 15 can be formed by local embossments in the limb 11. An electrically conductive coating 16 is also provided on the inner wall of the tube. This coating 16 with the coating 5 form a capacitor. In the case of black-and-white display tubes coating 16 is a vapour-deposited aluminium layer which also covers a display screen 17 provided on the display window 4. In the case of colour tubes the coating 16 is usually a graphite-containing layer.

Figure 3:
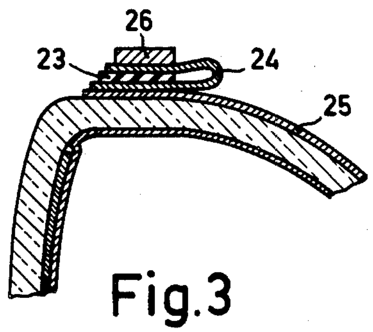
FIG. 3 is a sectional view similar to that shown in FIG. 2 of another embodiment of the invention.

In the embodiment shown in FIG. 3 the adhesive tape 23 is electrically shunted by a flexible strip 24 consisting, for example, of aluminium or copper. The strip 24 directly contacts the conductive coating 25 and also makes a metallic contact with the metal strap 26. In this case the mounting lugs of the tube may be welded to the metal strap 26.

What is claimed is:

1. A cathode ray tube comprising a glass envelope having a neck portion, a conical portion and a substantially rectangular display window having a side wall, an adhesive-containing layer provided around the side wall of the display window and a metal strap provided over said adhesive-containing layer, a coating of electrically readily conductive material provided on the external surface of said conical portion, and means for electrically connecting said strap to said coating, said means including an electrically conductive layer provided on the glass wall of the tube in the form of a suspension or paste, said conductive layer being in contact with the conductive coating on the conical portion and extending beneath the adhesive-containing layer and a metal contact member which directly contacts the portion of the conductive layer underlying the adhesive-containing layer and the metal strap so that the adhesive-containing layer is electrically shunted.

2. A cathode ray tube as claimed in claim 1, wherein the metal contact member is a flexible strip having a first portion disposed between the electrically conductive layer and the adhesive-containing layer, and a second portion disposed between the adhesive-containing layer and the metal strap.

3. A cathode ray tube as claimed in claim 1 wherein the metal contact member is a plate-shaped element disposed between the adhesive-containing layer and the electrically conductive layer, the surface of said element adjacent the adhesive-containing layer having at least one projection which projects through the adhesive-containing layer and makes a metallic contact with the metal strap.

4. A cathode ray tube as claimed in claim 1 wherein the metal contact member is disposed on at least one of the four corner portions of the side wall of the display window.

5. A cathode ray tube as claimed in claim 3 including a mounting lug at each of the four corner portions of the display window, said lug having a L-shaped cross-section and wherein said contact member is integral with at least one of the mounting lugs.

6. A cathode ray tube as claimed in claim 1 wherein the electrically conductive layer has the same composition as and is integral with the electrically conductive coating on the conical portion.

* * * * *